UNITED STATES PATENT OFFICE.

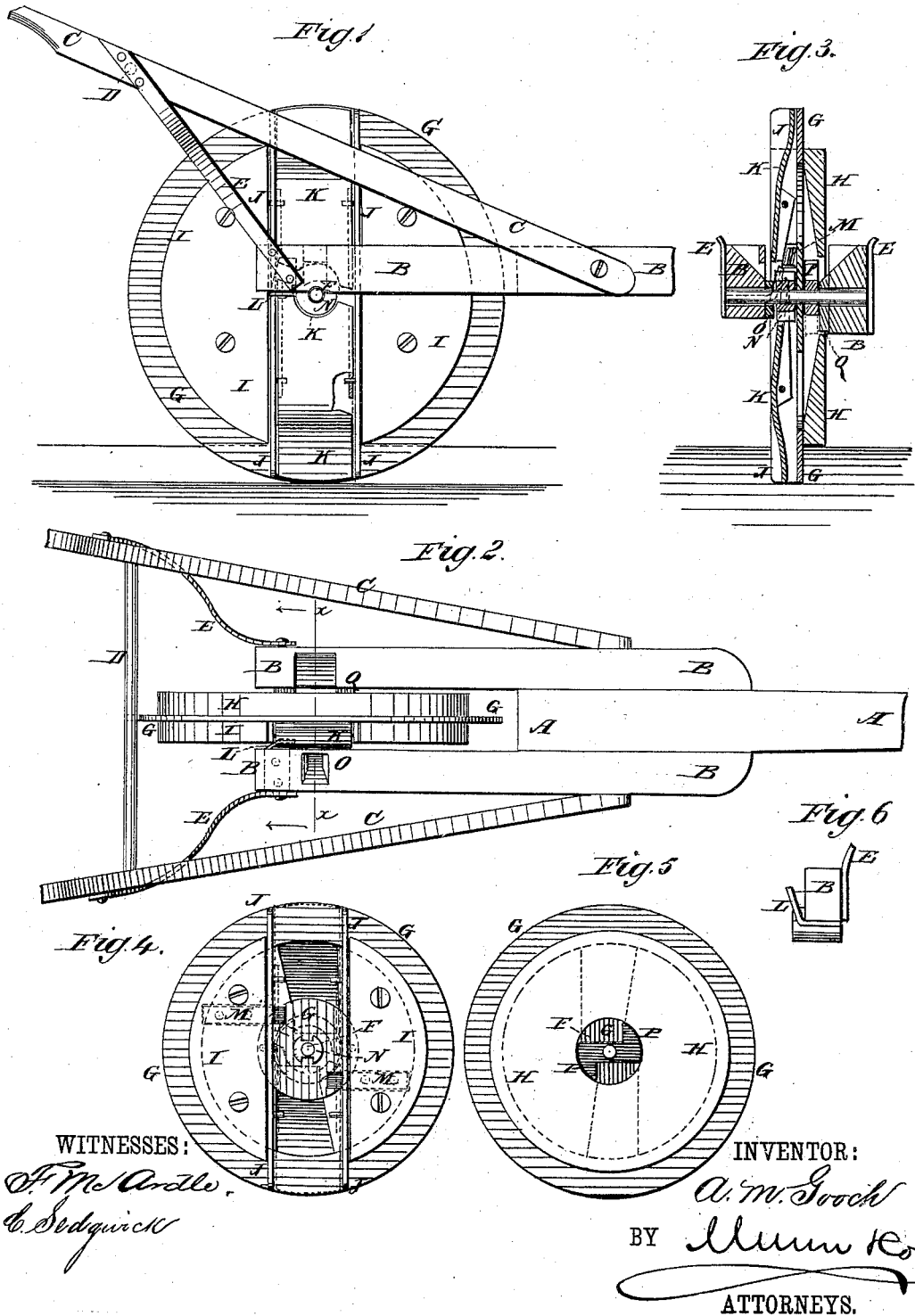

AMOS M. GOOCH, OF FARMINGTON, WEST VIRGINIA.

IMPROVEMENT IN COMBINED CORN-PLANTER AND FERTILIZER-DISTRIBUTER.

Specification forming part of Letters Patent No. 212,685, dated February 25, 1879; application filed January 20, 1879.

*To all whom it may concern:*

Be it known that I, AMOS MARSHALL GOOCH, of Farmington, in the county of Marion and State of West Virginia, have invented a new and useful Improvement in Combined Corn-Planter and Fertilizer-Distributer, of which the following is a specification:

Figure 1 is a side view of my improved machine, part being broken away to show the construction, and the hoppers being omitted. Fig. 2 is a top view of the same. Fig. 3 is a detail cross-section of the same, taken through the line $x\ x$, Fig. 2. Fig. 4 is a detail side view of the planting-roller, the seed-dropping plates being removed. Fig. 5 is a detail view of the other side of the planting-roller. Fig. 6 is a detail view of the inclined plate that opens the seed-dropping plates.

Similar letters of reference indicate corresponding parts.

The object of this invention is to furnish an improved corn-planter which shall be so constructed as to drop a fertilizer at the same time with the seed, which will roll or press down the soil around the seed, leaving a spot of loose earth for the plants to come up through, and which shall be simple in construction, convenient in use, and reliable in operation.

The invention consists in the combination of the axle, the circular metal plate, the circular wooden blocks, the pivoted plates and their incline and springs, and the two unequal dropping-cylinders and their rubber blocks with each other and with the side bars of the frame-work, as hereinafter fully described.

A represents the beam to which the draft is applied, and to the opposite sides of the rear end of which are bolted the forward ends of two parallel bars, B. The bars B form the frame of the planter, and to the outer sides of their forward parts are bolted the forward ends of the handles C, the rear parts of which are connected by a round, D.

The handles C are supported at the proper height by the braces E, the lower ends of which are bolted to the outer sides of the rear ends of the bars B, and their upper ends are attached to the handle C or round D.

In bearings attached to the lower sides of the rear parts of the side bars B revolve the journals of an axle, F, to the center of which is attached a circular sheet-metal plate, G.

To the opposite sides of the plate G are bolted circular wooden blocks H I, of sufficient thickness to roll the soil to the desired distance upon both sides of the row of hills. The wooden blocks H I are made of a less diameter than the center plate, G, the said plate G projecting beyond the faces of the said blocks H I for a distance equal to the depth at which the seed is to be planted.

A wide slot is cut transversely through the middle part of the wooden block I, and to the straight inner edges of the parts of said block I are attached sheet-metal strips J, of a width equal to the thickness of the block I, and of such a length that their ends may extend to the edge of the plate G.

The outer sides of the channels thus formed are closed by sheet-metal plates K, the side edges of the inner parts of which are bent inward, and are pivoted to the parts of the block I in such a position as to have a space between the inner parts of the said plates and the plate G to receive the seed and fertilizer. The outer parts of the plates K are curved inward and then outward, so as to rest squarely against the plate G, to prevent the seed and fertilizer from dropping out too soon.

The inner ends of the plates K are cut off upon an incline, and are forced inward to move their outer ends outward and drop the seed and fertilizer by their projecting corners striking against an inclined plate, L, attached to the rear end of the bar B in such a position as to operate the said plates just as their outer ends begin to rise from their point of lowest descent.

The inner ends of the plates K, when released from the incline L, are again forced outward by springs M, attached to the block I. The inner ends of the plates K have semicircular notches formed in them to receive and fit against the small cylinder N, attached to the axle F, at the side of the plate G.

In the opposite sides of the cylinder N are formed notches to receive seed from the hopper and discharge it into the space beneath the plates K, and which notches are made of such a size as to hold the exact amount of seed required for a hill. The seed passes from the hopper to the dropping-cylinder N through an inclined spout, channel, or recess in the bar B, and the said cylinder is kept from carrying out any more seed than enough to fill its notches by a rubber block, O, attached to the said bar B.

Through the center of the wooden block H is formed a circular hole to receive and fit upon the dropping-cylinder P, which is attached to the axle F, at the side of the plate G.

In the opposite sides of the cylinder P are formed notches to receive the fertilizer from a hopper attached to the bar B, and discharge it into the space beneath the inner parts of the plates K through holes in the plate G, so that the seed and fertilizer may be dropped together. The cylinder P is kept from carrying out any more of the fertilizer than enough to fill its notches by a rubber block, Q, attached to the bar B. The fertilizer passes from the hopper to the dropping-cylinder P through an inclined notch, channel, or spout in the bar B. The seed and fertilizer hoppers are designed to be attached to the rear parts of the bars B, upon the opposite sides of the planting-wheel. The hoppers are not shown in the drawings.

Having thus described my invention, I claim as new and desire to secure by Letters Patent—

The combination of the axle F, the circular metal plate G, the circular wooden blocks H I, the pivoted plates K and their incline L and springs M, and the two unequal dropping-cylinders N P and their rubber blocks O Q with each other and with the side bars B of the frame-work, substantially as herein shown and described.

AMOS MARSHALL GOOCH.

Witnesses:
W. B. SNODGRASS,
D. C. MARVIN.